US012255393B2

(12) United States Patent
Xu et al.

(10) Patent No.: US 12,255,393 B2
(45) Date of Patent: Mar. 18, 2025

(54) OSCILLATOR ANTENNA UNIT AND ANTENNA

(71) Applicant: Suzhou Luxshare Technology Co., Ltd., Suzhou (CN)

(72) Inventors: Wenkai Xu, Suzhou (CN); Chengyu Xu, Suzhou (CN); Kangning Lv, Suzhou (CN); Zhenhua Li, Suzhou (CN); Wanqiang Zhang, Suzhou (CN); Zhengguo Zhou, Suzhou (CN); Gang Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 250 days.

(21) Appl. No.: 17/957,015

(22) Filed: Sep. 30, 2022

(65) Prior Publication Data

US 2023/0111127 A1 Apr. 13, 2023

(30) Foreign Application Priority Data

Oct. 13, 2021 (CN) .......................... 202111194454.3

(51) Int. Cl.
*H01Q 1/52* (2006.01)
*H01Q 1/12* (2006.01)
*H01Q 1/36* (2006.01)
*H01Q 21/06* (2006.01)

(52) U.S. Cl.
CPC ........... *H01Q 1/521* (2013.01); *H01Q 1/1207* (2013.01); *H01Q 1/36* (2013.01); *H01Q 21/06* (2013.01)

(58) Field of Classification Search
None
See application file for complete search history.

(56) References Cited

U.S. PATENT DOCUMENTS

| | | | | |
|---|---|---|---|---|
| 2017/0317420 | A1 | 11/2017 | Farzaneh et al. | |
| 2021/0210840 | A1* | 7/2021 | Xu | H01Q 21/26 |
| 2024/0120666 | A1* | 4/2024 | Xu | H01Q 3/02 |
| 2024/0204423 | A1* | 6/2024 | Li | H01Q 9/16 |

FOREIGN PATENT DOCUMENTS

| | | | |
|---|---|---|---|
| CN | 104538733 | B | 7/2017 |
| CN | 109103577 | A | 12/2018 |
| CN | 109838428 | A | 4/2019 |
| CN | 111987438 | A | 11/2020 |

(Continued)

*Primary Examiner* — Jany Richardson
(74) *Attorney, Agent, or Firm* — Birch, Stewart, Kolasch & Birch, LLP

(57) ABSTRACT

An oscillator antenna unit and an antenna are disclosed. The oscillator antenna comprises a plurality of oscillator arms and a guiding sheet. The plurality of oscillator arms extend outwards along a middle axle of the oscillator antenna unit and are arranged at an interval from one another. Extension directions of the oscillator arms form a first plane, and the guiding sheet parallel to the first plane is arranged above the oscillator arms and has a predetermined interval therewith. The antenna comprises at least two oscillator antenna units arranged in an array. Therefore, the technical solution of the embodiment of the present disclosure may improve the isolation and achieve a better decoupling effect.

14 Claims, 11 Drawing Sheets

(56) References Cited

FOREIGN PATENT DOCUMENTS

| | | | |
|---|---|---|---|
| CN | 212542876 | U | 2/2021 |
| CN | 108879078 | B | 3/2021 |
| CN | 112635988 | A | 4/2021 |
| CN | 112787082 | A | 5/2021 |
| CN | 112803154 | A | 5/2021 |
| CN | 113410619 | A | 9/2021 |

* cited by examiner

OSCILLATOR ANTENNA UNIT AND ANTENNA

CLAIM OF PRIORITY AND CROSS-REFERENCE TO RELATED APPLICATION(S)

This application claims the benefit of Chinese Patent Application No. 202111194454.3, filed on Oct. 13, 2021, which is incorporated herein by reference in its entirety.

BACKGROUND OF THE INVENTION

1. Field of the Invention

The present disclosure relates to the field of antennas, and more particularly to an oscillator antenna unit and an antenna.

2. Description of the Related Art

With multi-frequency, miniaturization and complication of a base station antenna, how to realize the optimal performance index in each sub-band of an antenna on a same side becomes a bottleneck in research and development of a current base station antenna. It appears to be particularly crucial to design an oscillator with high isolation itself and decoupling function.

BRIEF DESCRIPTION OF THE INVENTION

According to one aspect of the present disclosure, there is provided an oscillator antenna unit and an antenna, where the oscillator has high isolation and decoupling function at the same time.

According to one aspect of the present disclosure, there is provided an oscillator antenna unit provided including a plurality of oscillator arms and a guiding sheet; wherein the plurality of oscillator arms that extend outwards along a middle axle of the oscillator antenna unit and are arranged at an interval from one another, extension directions of the oscillator arms forming a first plane; wherein the guiding sheet is parallel to the first plane, that is arranged above the oscillator arms and has a predetermined interval with the oscillator arms.

According to one aspect of the present disclosure, there is provided an antenna including at least two oscillator antenna units, wherein the oscillator antenna units are arranged in an array.

The embodiment of the present disclosure discloses an oscillator antenna unit and an antenna. The oscillator antenna includes a plurality of oscillator arms and a guiding sheet. The plurality of oscillator arms extend outwards along a middle axle of the oscillator antenna unit and are arranged at an interval from one another. Extension directions of the oscillator arms form a first plane, and the guiding sheet parallel to the first plane is arranged above the oscillator arms and has a predetermined interval therewith. The antenna includes at least two oscillator antenna units arranged in an array. Therefore, the technical solution of the embodiment of the present disclosure may improve the isolation and achieve a better decoupling effect.

BRIEF DESCRIPTION OF THE DRAWINGS

Through the following description of the embodiments of the present invention with reference to the drawings, the above and other objectives, features and advantages of the present invention will become more apparent, wherein.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

In addition, a person skilled in the art should understand that the drawings herein are provided for the purpose of description only, and are not necessarily drawn in proportion.

Unless otherwise stated, the terms "comprise", "include" and the like in the specification shall be interpreted as inclusive rather than exclusive or exhaustive; in other words, the terms mean "include but not limited to".

In the descriptions of the present invention, it should be understood that the terms like "first", "second" and the like are used for the purpose of description only, but cannot be considered to indicate or imply relative importance. In addition, in the descriptions of the present invention, unless otherwise stated, the meaning of "a plurality of" is two or more.

Furthermore, it should be understood that in the following descriptions, "circuit" refers to an electrical circuit formed by electrically connecting or electromagnetically connecting at least one element or sub-circuit. When one element or circuit is "connected to" another element or one element/circuit is "connected" between two nodes, the one element/circuit can be directly coupled or connected to another element or via an intermediate element, and the connection between the elements can be a physical connection, a logical connection or a combination thereof. On the contrary, when one element is "directly coupled to" or "directly connected to" another element, it means that no intermediate element is provided between the two elements.

Figure 1:
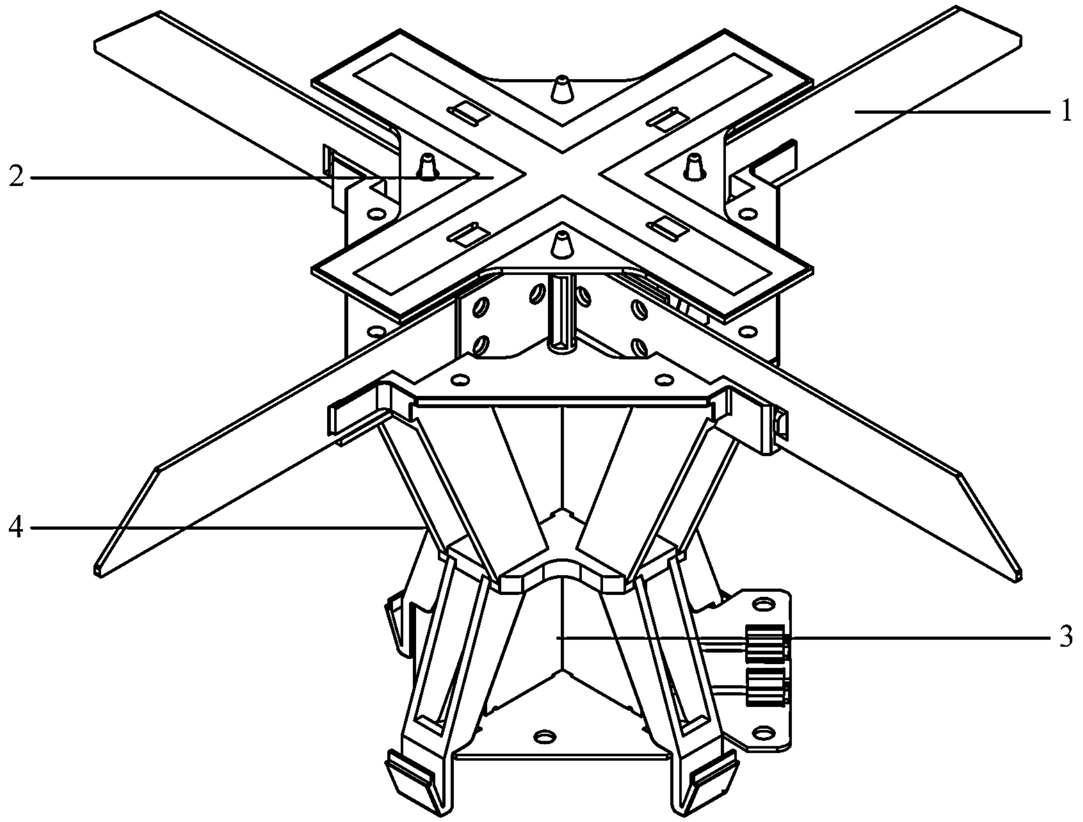
FIG. 1 is a schematic diagram of a three-dimensional structure of an oscillator antenna unit of an embodiment of the present disclosure.
Figure 2:
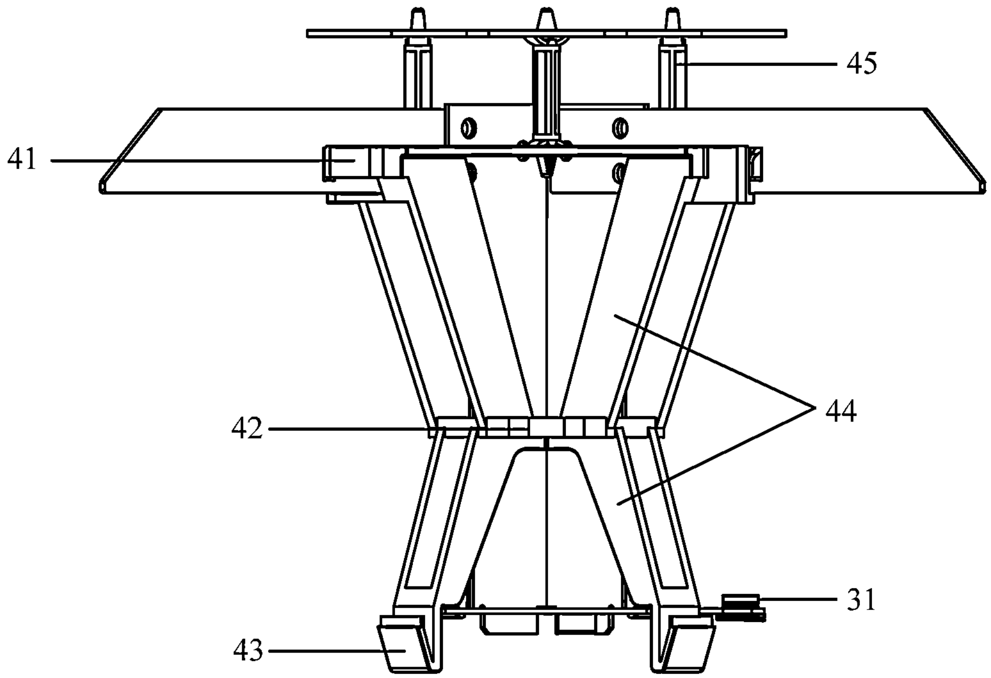
FIG. 2 is a top view of an oscillator antenna unit of an embodiment of the present disclosure.

FIG. 1 is a schematic diagram of a three-dimensional structure of an oscillator antenna unit of an embodiment of the present disclosure. FIG. 2 is a top view of an oscillator antenna unit of an embodiment of the present disclosure. As shown in FIG. 1 and FIG. 2, the oscillator antenna unit includes a plurality of oscillator arms 1 and a guiding sheet 2. The plurality of oscillator arms 1 that extend outwards along a middle axle of the oscillator antenna unit and are arranged at an interval from one another, extension directions of the oscillator arms 1 forming a first plane. The guiding sheet 2, parallel to the first plane, that is arranged above the oscillator arms 1 and has a predetermined interval with the oscillator arms 1. That is to say, the plurality of oscillator arms 1 are located on the same plane, the oscillator arms 1 and the guiding sheet 2 are respectively arranged on two planes parallel to each other, and the two planes have a certain interval, so that the position of the guiding sheet 2 is higher than those of the oscillator arms 1. The plurality of oscillator arms 1 are arranged around the center axle of the oscillator antenna unit, namely, the oscillator arms 1 are arranged in a circular array centered by the center axle, and are spaced at a certain angle one another. The guiding sheet 2 is then formed in a lamellar shape with a hollowed pattern thereon. The oscillator arms 1 are made of electrically conducting materials, and the guiding sheet 2 is made of a electrically conducting metal. In one embodiment, the guiding sheet 2 is made of a metal copper, and optionally, the guiding sheet 2 may be made of other materials.

Further, the guiding sheet 2 has guiding arms 21, a quantity of the guiding arms 21 is identical to a quantity of the oscillator arms 1, and an extension direction of each of the guiding arms 21 corresponds to an extension direction of a corresponding one of the oscillator arms 1. That is to say, the guiding sheet 2 has protrusions equal to the oscillator arms 1 in quantity to form the guiding arms 21, and the guiding arms 21 have the extension directions identical to those of the oscillator arms 1. That is, the guiding arms 21 are arranged around the center axle of the oscillator antenna unit and have a predetermined interval angle one another. The design may help to form synchronous waves between the guiding sheet 2 and the oscillator arms 1 to achieve a filter effect, thereby achieving a purpose of improving the isolation.

In the embodiment, the first plane is a horizontal plane. The oscillator antenna unit has four oscillator arms 1 that are arranged to be orthogonal from one another and are arranged perpendicular to the first plane. That is to say, the four oscillator arms 1 at an interval of 90° one another are arranged around the center axis of the oscillator antenna unit and respectively form a sheet perpendicular to a horizontal plane. The guiding sheet 2 has four guiding arms 21 that are arranged to be orthogonal from one another, so that the guiding sheet 2 may be formed in a cross shape, with a cross-shaped hollowed pattern. That is to say, the guiding sheet 2 is formed in a band shape with a certain width, encircling a hollow cross shape. Optionally, the oscillators 1 and the guiding sheet 2 may be arranged in other forms, which is not limited in the disclosure.

Further, a length of each of the oscillator arms 1 is equal to ¼ of a wavelength of a center frequency point of the oscillator antenna unit, and a perimeter of the guiding sheet 2 is equal to the wavelength of the center frequency point of the oscillator antenna unit. Due to the design of the dimension, the oscillator antenna unit may achieve a better working effect. The wavelength of the center frequency point is an intermediate value of a working frequency band of the oscillator antenna unit. In one embodiment, the working frequency band of the unit is 700 Mhz-900 Mhz, and the wavelength of the center frequency point is 800 Mhz. Optionally, the oscillator antenna unit further may have other working frequency bands and wavelengths of the center frequency point.

Figure 3:
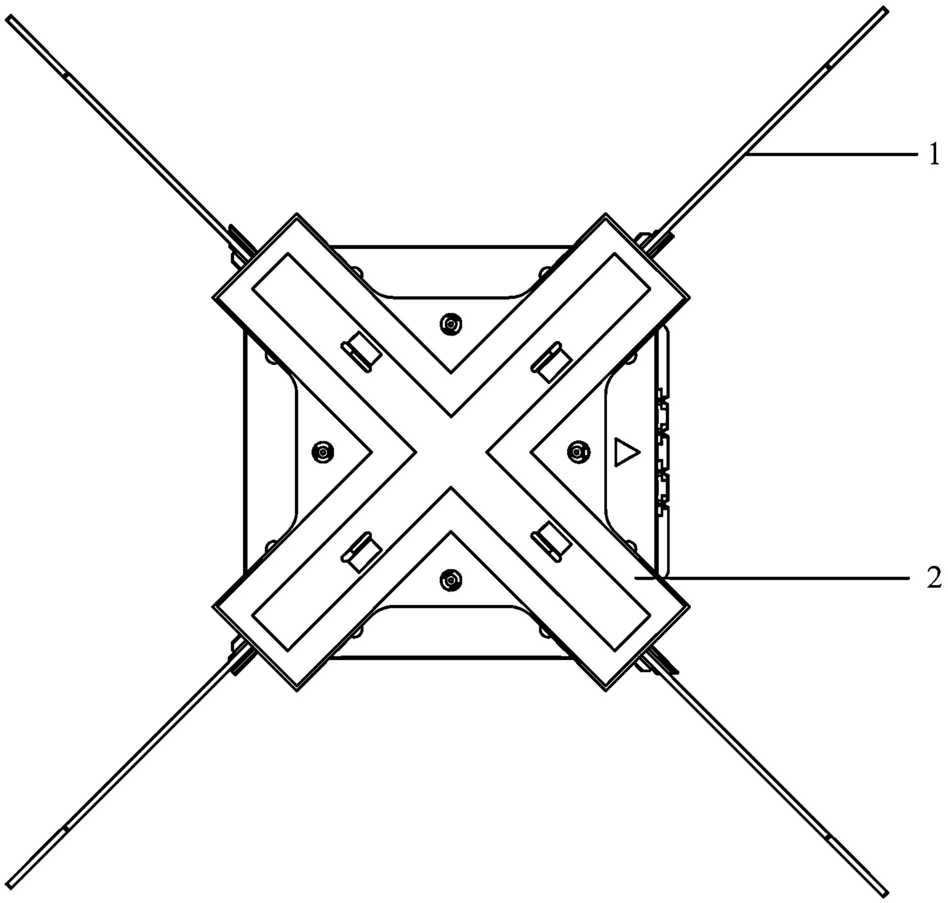
FIG. 3 is a structural schematic diagram of a feeding component of an oscillator antenna unit of an embodiment of the present disclosure.

FIG. 3 is a structural schematic diagram of a feeding component of an oscillator antenna unit of an embodiment of the present disclosure. As shown in FIG. 3, the oscillator antenna unit further includes a feeding component 3, wherein the feeding component 3 is electrically connected with the oscillator arms 1 and has a connector 31 that is electrically connected with an external coaxial cable. By using the external coaxial cable, the oscillator antenna unit may be stable in structure, a risk of discontinuous match may be reduced, and the oscillator antenna unit may have a certain advantage in intermodulation.

Further, the feeding component 3 may be arranged on a printed circuit board. The feeding component 3 includes two first circuit boards 321 arranged in a cross manner and a second circuit board 322 located below the first circuit boards 321, the first circuit boards 321 and the second circuit board 322 are electrically connected, and the connector 31 is arranged on the second circuit board 322. That is to say, the feeding component 3 consists of three circuit boards including two first circuit boards 321 and one second circuit board 322. The two first circuit boards 321 are located above the second circuit board 322, are arranged along a perpendicular direction and form a cross shape, and are configured to be balun, namely, transformer in use. The second circuit board 322 is arranged along a horizontal direction and has a connector 31 electrically connected with an external coaxial cable so as to realize a feeding function. Due to the design, the feeding component 3 may able to play a certain supporting role for the structure of the oscillator antenna unit. Optionally, the feeding component 3 may also have other configurations. The quantities of the first circuit boards 321 and the second circuit boards 322 may be varied.

Figure 4:
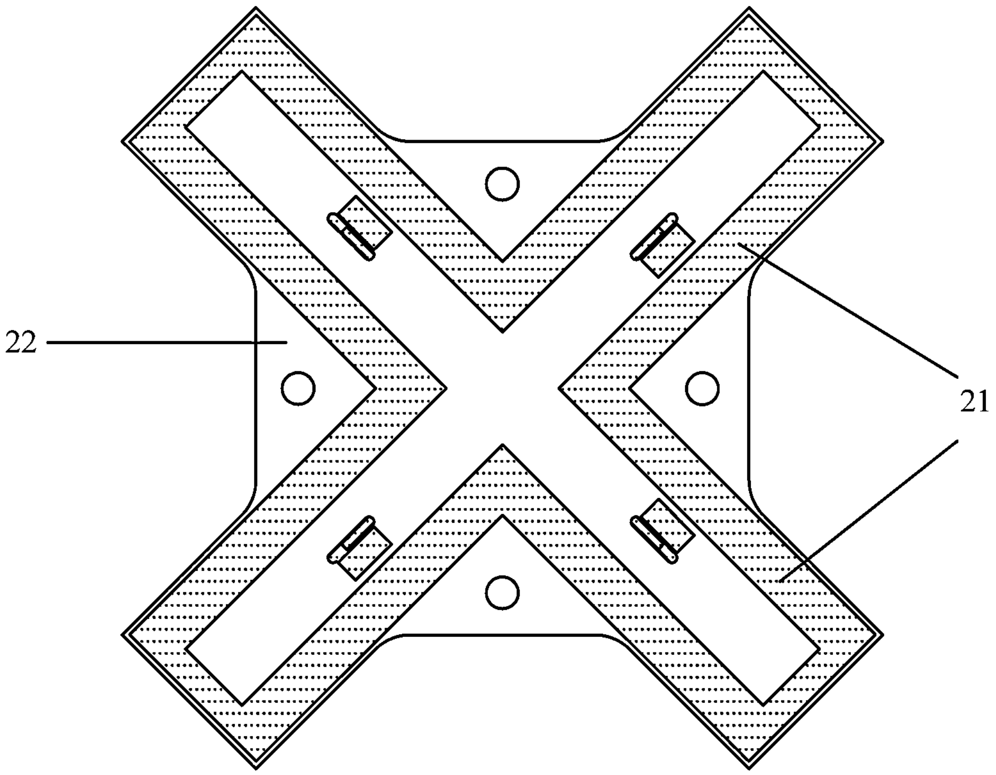
FIG. 4 is a structural schematic diagram of a guiding sheet and a guiding plate of an oscillator antenna unit of an embodiment of the present disclosure.
Figure 5:
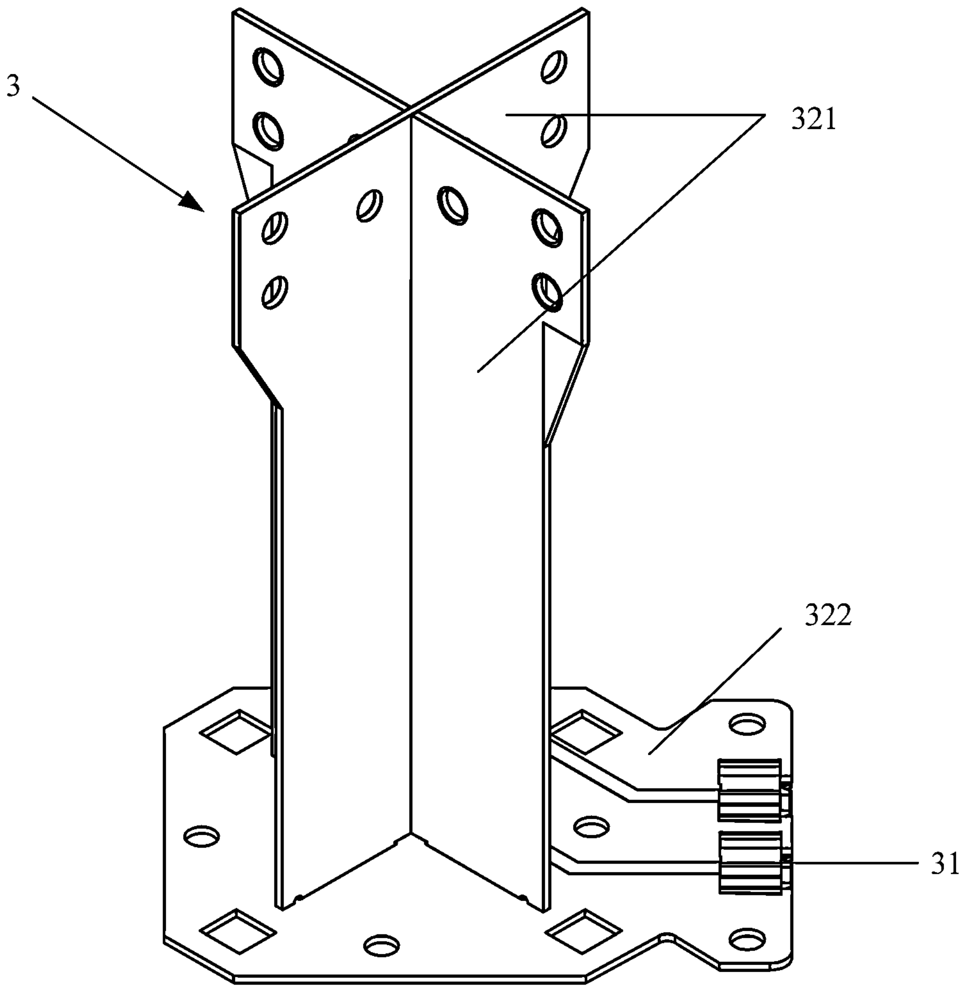
FIG. 5 is a side view of an oscillator antenna unit of an embodiment of the present disclosure.

FIG. 4 is a structural schematic diagram of a guiding sheet and a guiding plate of an oscillator antenna unit of an embodiment of the present disclosure. FIG. 5 is a side view of an oscillator antenna unit of an embodiment of the present disclosure. As shown in FIG. 4 and FIG. 5, the oscillator antenna unit further includes a bracket 4, wherein the bracket 4 is sleeved outside the feeding component 3; a top of the bracket 4 has a riveting press portion 41 that rivets and fixes each of the oscillator arms 1 to fix each of the oscillator arms; a middle portion of the bracket 4 has a fixing portion 42 that fixes the feeding component 3; a bottom of the bracket 4 has a connecting portion 43 configured to be installed in an external structure; and a supporting plate 44 at a certain included angle with a perpendicular direction is arranged between the riveting press portion 41 and the fixing portion 42. That is to say, the oscillator arms 1 and the riveting press portion 41 are in riveting pressure connections. Due to the design, structures such as screws may not used, so that the cost may be lowered. Intermodulation performance of the oscillator antenna unit may be prevented from being affected by other additional components. The feeding component 3 is fixed to the bracket 4 through the fixing portion 42, and the bracket 4 is sleeved outside the feeding component 3 to play a certain role thereon so as to prevent the feeding component 3 from being pressed. The supporting plate 44 between the riveting press portion 41 and the fixing portion 42 has a certain inclined angle, so that the structure of the bracket 4 may be more stable and may be stressed more evenly. The bracket 4 has the connecting portion 43, so that it is convenient to connect the oscillator antenna unit with the external structure. In the embodiment, by cooperation with an arrangement structure of the oscillator arms 1 and the first circuit boards 321 of the feeding component 3, the riveting press portions 41 are arranged at four corners of the bracket 4. The fixing portion 42 is in a plate shape with a cross hollowed portion. The riveting press portions 41 and the fixing portion 42 are interconnected through the supporting plate 44 inclining towards the bracket 4. Optionally, the bracket 4 may be in other shapes, which is dependent on a specific production condition. The bracket 4 is made of an insulating material.

Further, in order to have a certain interval between the guiding sheet 2 and each of the oscillator arms 1, the oscillator antenna unit further includes a guiding plate 22, wherein the guiding plate 22 has a shape matched with the guiding sheet 2 and is configured to support the guiding sheet 2. The guiding plate 22 is fixedly connected with the bracket 4 through supporting columns 45. That is to say, as the guiding sheet 2 is lamellar and easy to deform, it is necessary to arrange the guiding plate 22 matched with its shape so as to form a supporting effect thereon. At the same time, the supporting columns 45 are arranged between the guiding plate 22 and the bracket 4, and the distances between the oscillator arms 1 and the guiding sheet 2 may be adjusted according to the lengths of the supporting columns 45, so that performance of the oscillator antenna unit is adjusted. The guiding plate 22 and the supporting columns 45 are made of insulating materials. In the embodiment, the guiding plate 22 is formed in a cross shape similar to the shape of the guiding sheet 2 and is integrally formed with the guiding sheet 2, the guiding plate 22 has through holes around for the supporting columns 45 to pass through, and its material is an FR-4 epoxy glass fabric laminated sheet. That is, the guiding sheet 2 and the guiding plate 22 jointly form a structure covered with a metal copper strip at the edge of the cross-shaped epoxy glass fabric laminated sheet. Optionally, the guiding sheet 22 may have other shapes, and a connection mode with the guiding sheet 2 may be changed either, for example, the two are pasted and combined. The material of the guiding plate 22 may also change and may be other insulating material.

Figure 6:
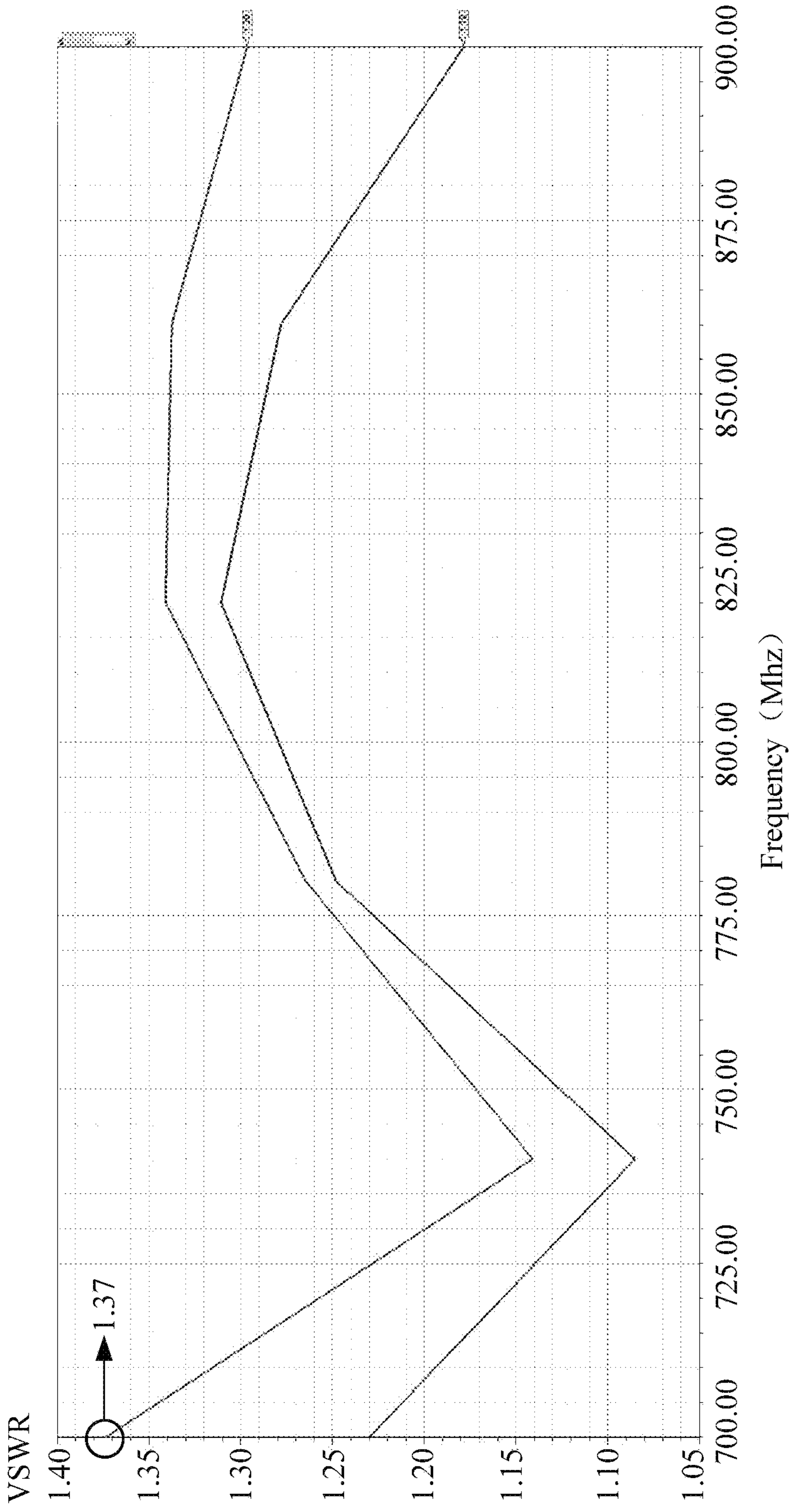
FIG. 6 is a schematic diagram of a standing-wave ratio of an oscillator antenna unit of an embodiment of the present disclosure.
Figure 7:
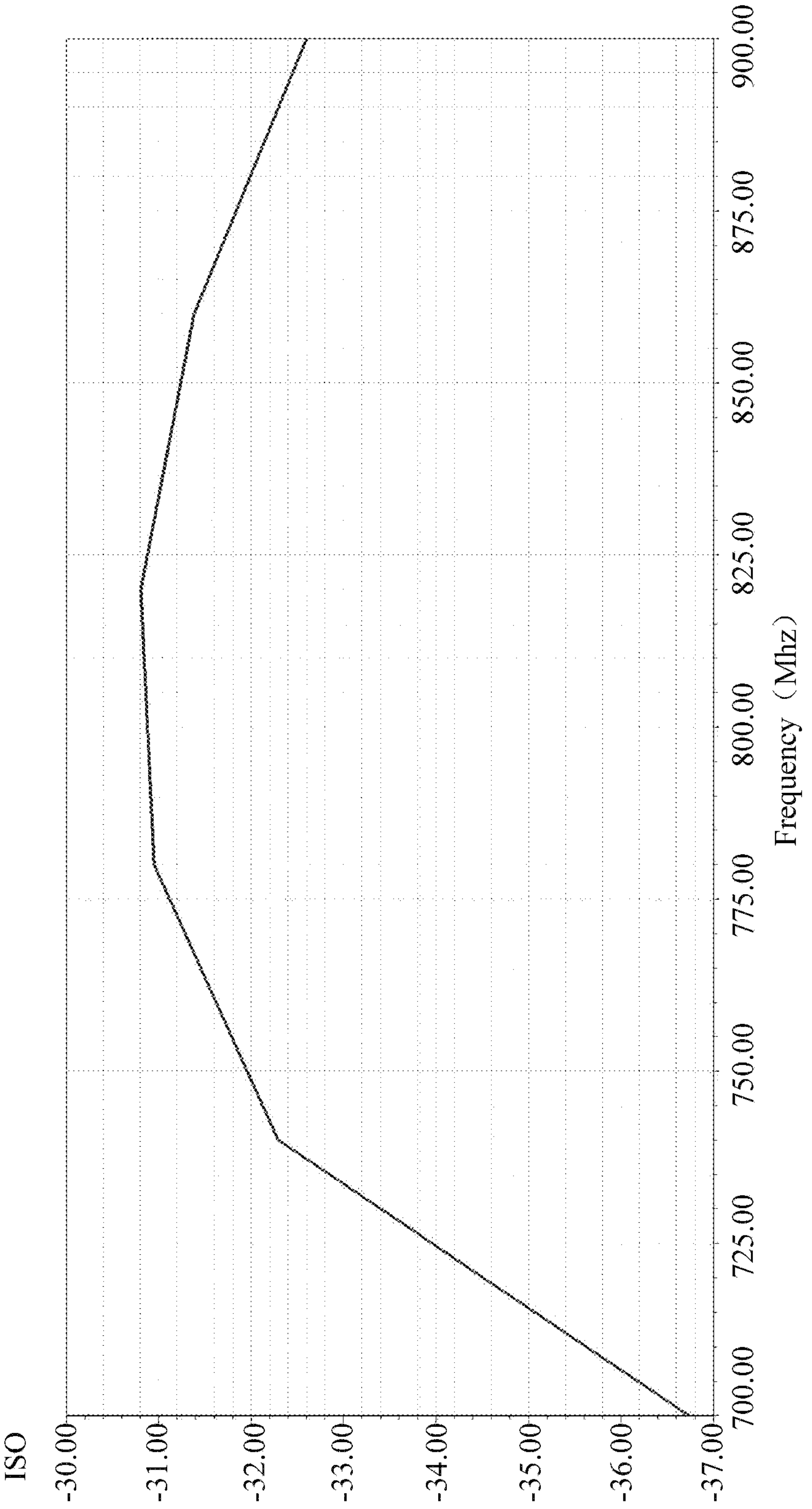
FIG. 7 is a schematic diagram of an isolation of an oscillator antenna unit of an embodiment of the present disclosure.
Figure 8:
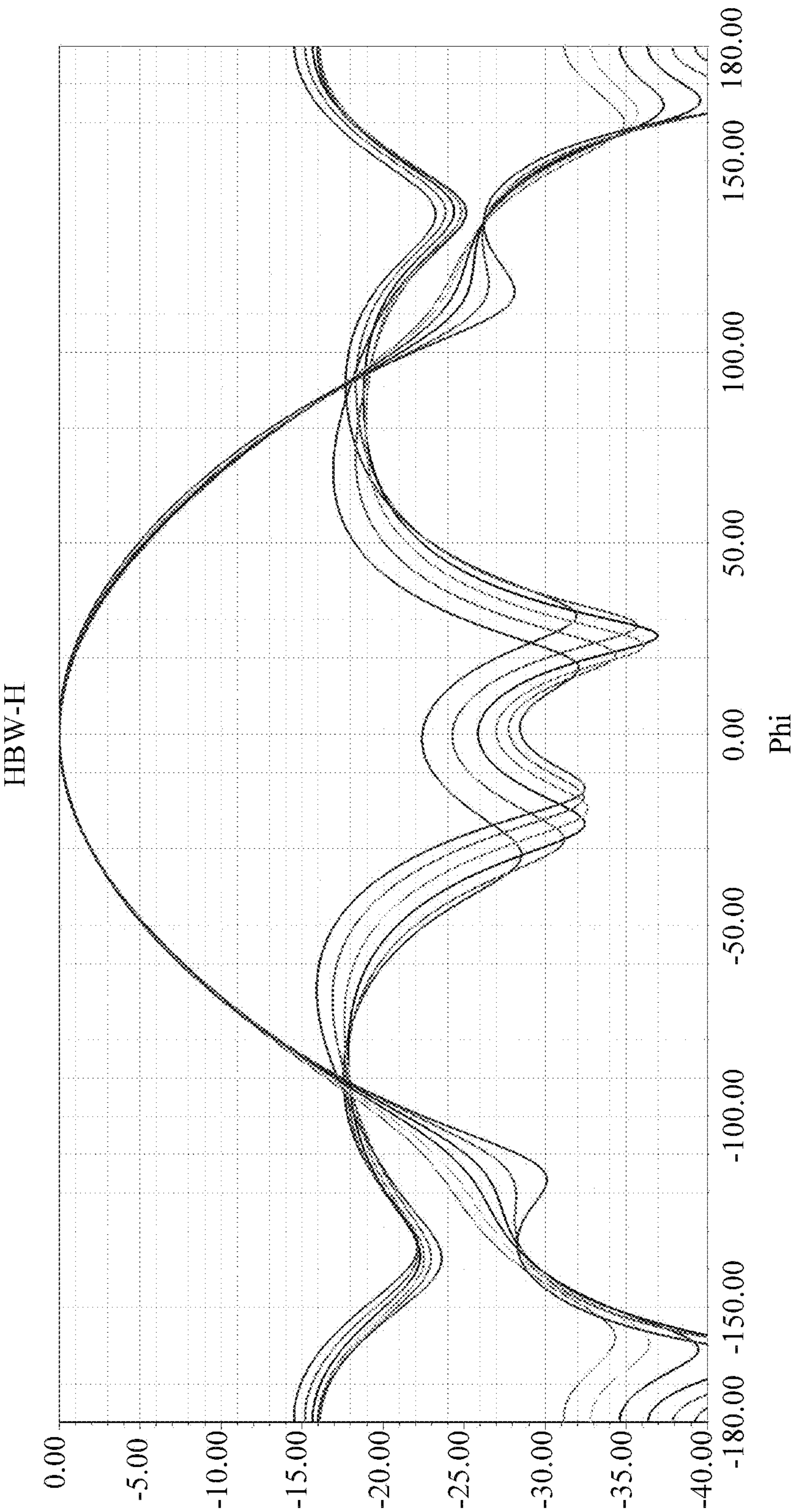
FIG. 8 is a directional diagram of an oscillator antenna unit of an embodiment of the present disclosure.
Figure 9:
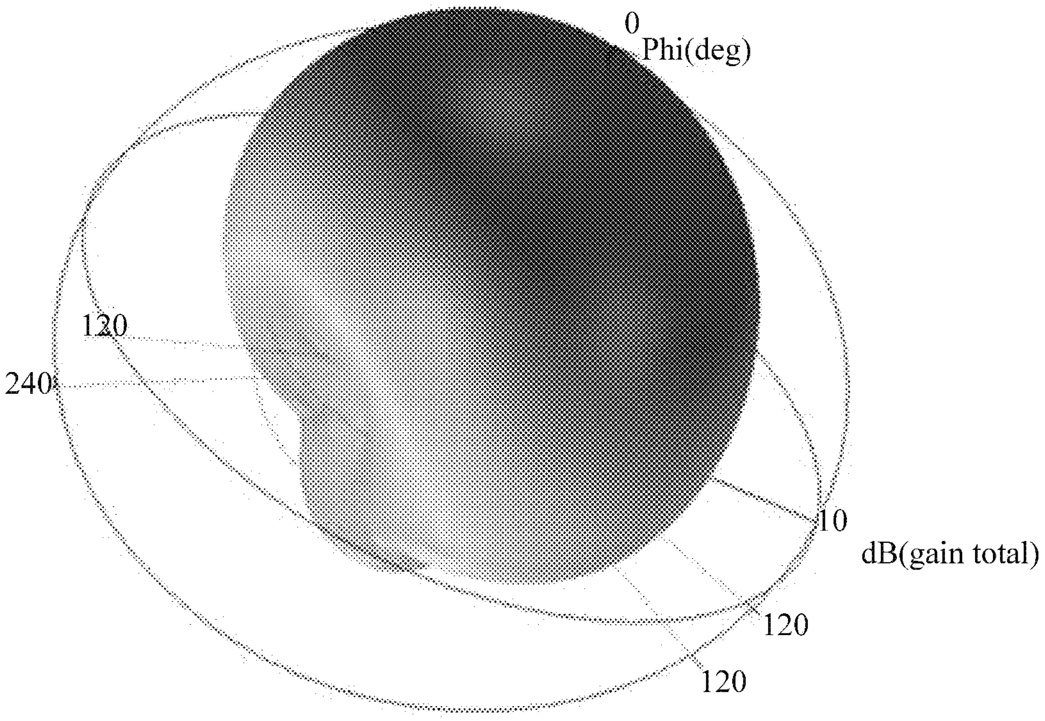
FIG. 9 is a three-dimensional directional diagram of an oscillator antenna unit of an embodiment of the present disclosure.

FIG. 6 is a schematic diagram of a standing-wave ratio of an oscillator antenna unit of an embodiment of the present disclosure. FIG. 7 is a schematic diagram of an isolation of an oscillator antenna unit of an embodiment of the present disclosure. FIG. 8 is a directional diagram of an oscillator antenna unit of an embodiment of the present disclosure. FIG. 9 is a three-dimensional directional diagram of an oscillator antenna unit of an embodiment of the present disclosure. As shown in FIG. 6, FIG. 7, FIG. 8 and FIG. 9, the standing-wave ratio (VSWR) of the oscillator antenna unit of the embodiment of the present disclosure is less than 1.37, an isolation (ISO) thereof reaches −30 db, an axial cross polarization ratio (HBW-H) thereof reaches −22 db, and its performance may be relatively excellent.

Figure 10:
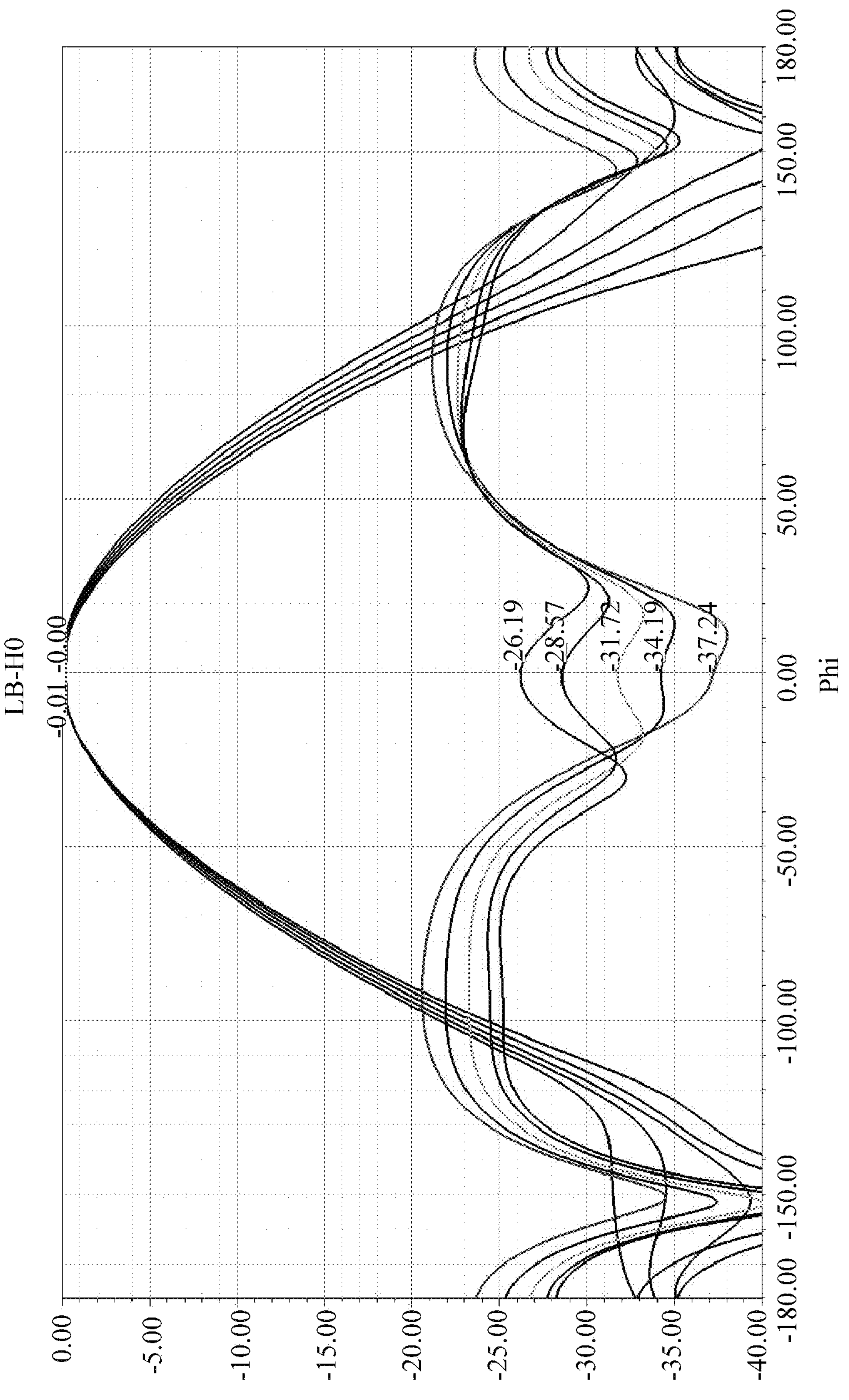
FIG. 10 is a directional diagram of an antenna of an embodiment of the present disclosure.

FIG. 10 is a directional diagram of an antenna of an embodiment of the present disclosure. Specifically, it is necessary to form an antenna by the oscillator antenna units in actual application. The antenna of the embodiment of the present disclosure consists of at least two oscillator antenna units arranged in an array. As shown in FIG. 10, it can be seen that the antenna of the embodiment of the present disclosure may be excellent in decoupling performance in a multi-frequency base station, the directional diagram is convergent, and the cross polarization ratio may be excellent.

Figure 11:
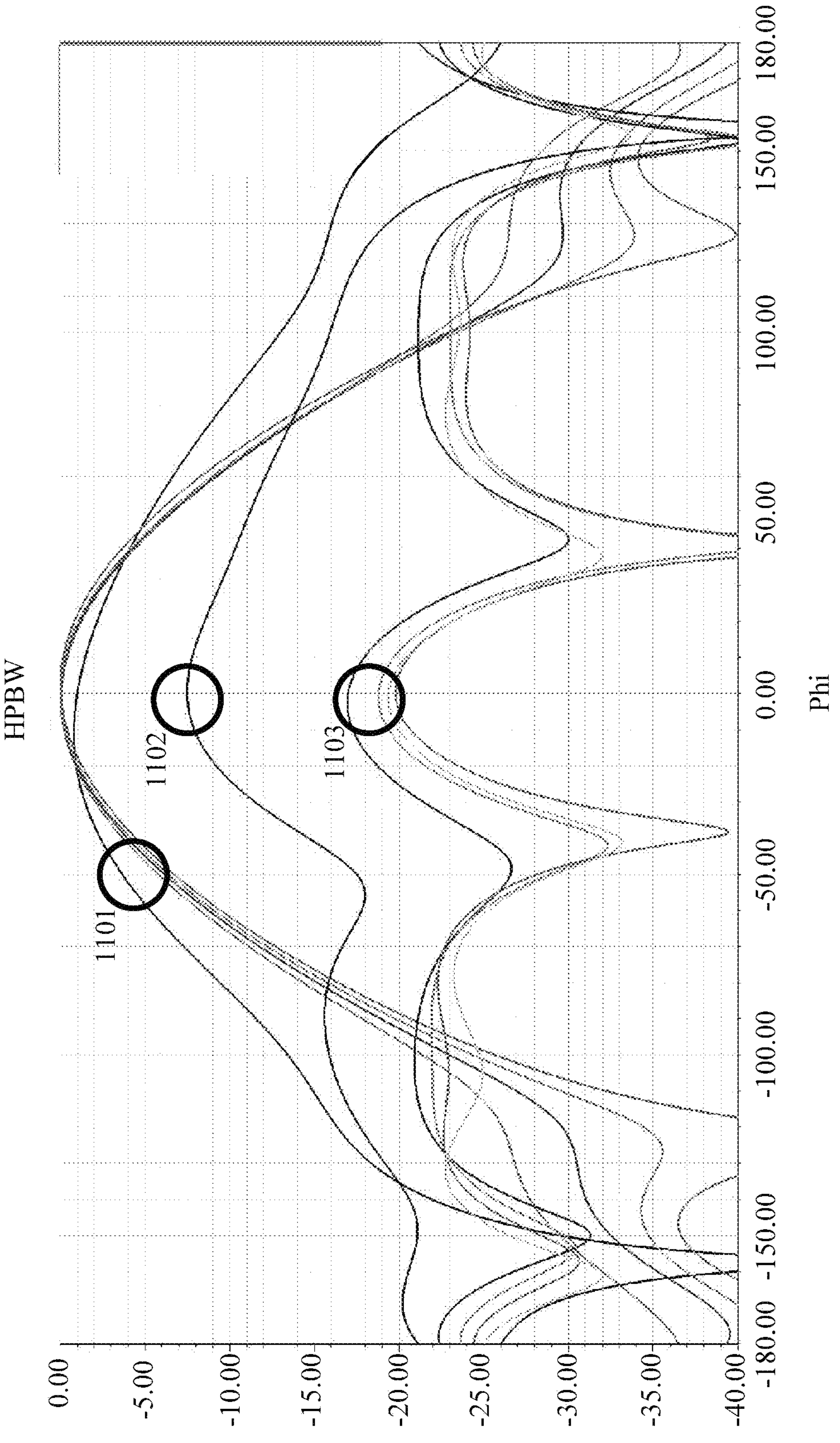
FIG. 11 is a directional diagram of other antennas.

FIG. 11 is a directional diagram of other antennas that are different from the embodiment of the present disclosure. As shown in FIG. 11, it can be seen from annotated circles 1101, 1102 and 1103 that the cross polarization ratio of the directional diagram is relatively poor and is greatly affected by a high frequency oscillator, and its performance is inferior to that of the antenna of the embodiment of the present disclosure.

The embodiment of the present disclosure discloses an oscillator antenna unit and an antenna. The oscillator antenna includes a plurality of oscillator arms and a guiding sheet. The plurality of oscillator arms extend outwards along a middle axle of the oscillator antenna unit and are arranged at an interval from one another. Extension directions of the oscillator arms form a first plane, and the guiding sheet parallel to the first plane is arranged above the oscillator arms and has a predetermined interval therewith. The antenna includes at least two oscillator antenna units arranged in an array. Therefore, the technical solution of the embodiment of the present disclosure may improve the isolation and achieve a better decoupling effect.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. An oscillator antenna unit, comprising:

a plurality of oscillator arms (1) that extend outwards along a middle axle of the oscillator antenna unit and are arranged at an interval from one another, wherein extension directions of the oscillator arms (1) forming a first plane;

a guiding sheet (2), parallel to the first plane, arranged above the oscillator arms (1) and has a predetermined interval with the oscillator arms (1); and a feeding component (3), wherein the feeding component (3) is electrically connected with the oscillator arms (1) and has a connector (31) that is electrically connected with an external coaxial cable.

2. The oscillator antenna unit of claim 1, wherein the guiding sheet (2) has:

guiding arms (21), wherein a quantity of the guiding arms (21) is identical to a quantity of the oscillator arms (1), and an extension direction of each of the guiding arms (21) corresponds to an extension direction of a corresponding one of the oscillator arms (1).

3. The oscillator antenna unit of claim 2, having the four oscillator arms (1) that are arranged to be orthogonal from one another, the oscillator arms (1) being arranged perpendicular to the first plane.

4. The oscillator antenna unit of claim 3, wherein the guiding sheet (2) has four guiding arms (21) that are arranged to be orthogonal from one another, so that the guiding sheet (2) is formed in a cross shape, with a hollowed pattern.

5. The oscillator antenna unit of claim 1, wherein a length of each of the oscillator arms (1) is equal to ¼ of a wavelength of a center frequency point of the oscillator antenna unit.

6. The oscillator antenna unit of claim 1, wherein a perimeter of the guiding sheet (2) is equal to the wavelength of the center frequency point of the oscillator antenna unit.

7. The oscillator antenna unit of claim 1, wherein each of the oscillator arms (1) is made of an electrically conducting material; and the guiding sheet (2) is made of an electrically conducting metal.

8. The oscillator antenna unit of claim 1, wherein the feeding component (3) is arranged on a printed circuit board and comprises:

two first circuit boards (321), arranged in a cross manner; and a second circuit board (322), located below the first circuit boards (321);

wherein the first circuit boards (321) and the second circuit board (322) are electrically connected; and the connector (31) is arranged on the second circuit board (322).

9. The oscillator antenna unit of claim 1, further comprising:

a bracket (4), wherein the bracket (4) is sleeved outside the feeding component (3), a top of the bracket (4) has riveting press portions (41) that rivet and press each of the oscillator arms (1) to fix each of the oscillator arms, a middle portion of the bracket (4) has a fixing portion (42) that fixes the feeding component (3), and a bottom of the bracket (4) has a connecting portion (43) configured to be installed in an external structure.

10. The oscillator antenna unit of claim 9, wherein the bracket (4) further has:

a supporting plate (44), wherein the supporting plate (44) is at a predetermined included angle with a perpendicular direction and arranged between the riveting press portions (41) and the fixing portion (42).

11. The oscillator antenna unit of claim 9, wherein the bracket (4) is made of an insulating material.

12. The oscillator antenna unit of claim 9, further comprising:

a guiding plate (22), wherein the guiding plate (22) has a shape matched with the guiding sheet (2) and is configured to support the guiding sheet (2), and the guiding plate (22) is fixedly connected with the bracket (4) through supporting columns (45), so that the guiding sheet (2) and each of the oscillator arms (1) have the predetermined interval;

wherein the guiding plate (22) and the supporting columns (45) are made of insulating materials.

13. An antenna, comprising at least two oscillator antenna units of claim 1, wherein the oscillator antenna units are arranged in an array.

14. An antenna, comprising at least two oscillator antenna units, wherein the oscillator antenna units are arranged in an array;

wherein the oscillator antenna unit comprises:

a plurality of oscillator arms (1) that extend outwards along a middle axle of the oscillator antenna unit and are arranged at an interval from one another, wherein extension directions of the oscillator arms (1) forming a first plane;

a guiding sheet (2), parallel to the first plane, arranged above the oscillator arms (1) and has a predetermined interval with the oscillator arms (1);

a feeding component (3), wherein the feeding component (3) is electrically connected with the oscillator arms (1) and has a connector (31) that is electrically connected with an external coaxial cable; and a bracket (4), wherein the bracket (4) is sleeved outside the feeding component (3), a top of the bracket (4) has riveting press portions (41) that rivet and press each of the oscillator arms (1) to fix each of the oscillator arms.

* * * * *